DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 8

T952,009

LATEX FOAM HAVING REDUCED SMOKE EMISSION ON COMBUSTION

David Francis Lawson, 163 W. Wellock Drive 44319; Durward Thomas Roberts, Jr., 616 Castle Blvd. 44303; and Edward Leo Kay, 79 S. Tamarack Road 44319, all of Akron, Ohio

Continuation of abandoned application Ser. No. 518,006, Oct. 25, 1974. This application Oct. 20, 1975, Ser. No. 624,022

Int. Cl.[2] C08J *9/30*

U.S. Cl. 260—2.5 L

No Drawing. 14 Pages Specification

Latex foam containing from 20 to 200 parts by weight of magnesium hydroxide per 100 parts of elastomer produces lower smoke levels on combustion.